(12) United States Patent
Hill et al.

(10) Patent No.: US 7,692,394 B2
(45) Date of Patent: Apr. 6, 2010

(54) POWER SUPPLY OUTPUT CONTROL APPARATUS AND METHOD

(75) Inventors: Christopher L. Hill, Apple Valley, MN (US); Garry E. Korbel, New Prague, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 34 days.

(21) Appl. No.: 09/995,206

(22) Filed: Nov. 27, 2001

(65) Prior Publication Data

US 2002/0079856 A1 Jun. 27, 2002

Related U.S. Application Data (60) Provisional application No. 60/253,216, filed on Nov. 27, 2000.

(51) Int. Cl.
*H02P 3/00* (2006.01)
*H02P 5/00* (2006.01)

(52) U.S. Cl. ............... 318/139; 320/148; 320/149; 320/163

(58) Field of Classification Search ........... 318/560, 318/567, 635, 626, 672, 696, 701, 778, 812, 318/272, 430, 434, 782, 139; 700/1–89; 361/5–7, 15–17, 21, 23, 29–31, 33, 52, 59, 361/65, 79, 86, 87, 90, 91–96, 110; 388/934; 320/148, 162

See application file for complete search history.

(56) References Cited

U.S. PATENT DOCUMENTS

| | | | | |
|---|---|---|---|---|
| 3,569,807 A | * | 3/1971 | Ulrich | 318/246 |
| 3,670,237 A | * | 6/1972 | Hubel et al. | 363/50 |
| 3,972,535 A | * | 8/1976 | Bleiman | 369/266 |
| 4,410,845 A | * | 10/1983 | Lockyear | 318/459 |
| 4,493,001 A | * | 1/1985 | Sheldrake | 361/92 |
| 4,547,715 A | * | 10/1985 | Li | 388/822 |
| 4,558,264 A | * | 12/1985 | Weischedel | 318/254 |
| 4,574,228 A | * | 3/1986 | Blue et al. | 318/696 |
| 4,673,851 A | * | 6/1987 | Disser | 388/831 |
| 4,682,095 A | * | 7/1987 | Shibata et al. | 318/778 |
| 4,804,901 A | * | 2/1989 | Pertessis et al. | 318/786 |
| 4,893,067 A | * | 1/1990 | Bhagwat et al. | 388/823 |
| 4,967,291 A | * | 10/1990 | Touchton et al. | 360/78.04 |
| 5,017,854 A | * | 5/1991 | Gully et al. | 318/811 |
| 5,028,852 A | * | 7/1991 | Dunfield | 318/254 |
| 5,117,165 A | | 5/1992 | Cassat et al. | |
| 5,179,494 A | * | 1/1993 | Matsubara | 361/91.2 |
| 5,191,269 A | * | 3/1993 | Carbolante | 318/254 |
| 5,245,496 A | * | 9/1993 | Kim et al. | 361/30 |
| RE34,399 E | | 10/1993 | Gami et al. | |
| 5,254,914 A | * | 10/1993 | Dunfield et al. | 318/254 |
| 5,278,747 A | * | 1/1994 | Falt et al. | 363/37 |
| 5,293,152 A | * | 3/1994 | Bussin et al. | 340/435 |
| 5,339,489 A | * | 8/1994 | Journee et al. | 15/250.203 |
| 5,412,809 A | | 5/1995 | Tam et al. | |
| 5,457,364 A | | 10/1995 | Bilotti et al. | |

(Continued)

*Primary Examiner*—Bentsu Ro
*Assistant Examiner*—Erick Glass
(74) *Attorney, Agent, or Firm*—Fellers, Snider, et al.

(57) ABSTRACT

A motor current control method is provided to reduce voltage and current spikes within a spindle motor and a power supply. Subsequently, the amount of current applied to the spindle motor is monitored. In addition, an apparatus for limiting motor power is provided.

10 Claims, 5 Drawing Sheets

U.S. PATENT DOCUMENTS

| | | | |
|---|---|---|---|
| 5,457,365 A | 10/1995 | Blagaila et al. | |
| 5,574,608 A * | 11/1996 | Fukuoka | 361/23 |
| 5,598,071 A | 1/1997 | Dunfield et al. | |
| 5,612,580 A * | 3/1997 | Janonis et al. | 307/64 |
| 5,650,705 A * | 7/1997 | Hart | 318/635 |
| 5,666,066 A * | 9/1997 | Jo | 324/772 |
| 5,675,230 A | 10/1997 | Dunfield | |
| 5,706,222 A * | 1/1998 | Bonaccio et al. | 708/841 |
| 5,719,732 A * | 2/1998 | Nagahama et al. | 361/29 |
| 5,767,639 A * | 6/1998 | Sakaguchi et al. | 318/254 |
| 5,821,727 A * | 10/1998 | Yura | 318/809 |
| 5,825,234 A | 10/1998 | Sung et al. | |
| 5,832,324 A * | 11/1998 | Shimizu et al. | 396/303 |
| 5,839,092 A * | 11/1998 | Erger et al. | 702/58 |
| 5,841,252 A * | 11/1998 | Dunfield | 318/254 |
| 5,844,388 A | 12/1998 | Maiocchi | |
| 5,847,523 A | 12/1998 | Rappenecker et al. | |
| 5,854,731 A * | 12/1998 | Thomas | 361/93.8 |
| 5,898,296 A * | 4/1999 | Maddox et al. | 323/282 |
| 5,910,715 A * | 6/1999 | Kim et al. | 318/254 |
| 5,912,543 A | 6/1999 | Mahr et al. | |
| 5,949,121 A * | 9/1999 | Qualich et al. | 257/467 |
| 5,952,817 A * | 9/1999 | Brewster et al. | 323/268 |
| 5,959,419 A | 9/1999 | Sugiyama | |
| 5,959,817 A * | 9/1999 | Kessler et al. | 361/33 |
| 6,008,619 A * | 12/1999 | Murase et al. | 318/811 |
| 6,011,375 A * | 1/2000 | Korbel et al. | 318/599 |
| 6,043,631 A * | 3/2000 | Tsenter | 320/148 |
| 6,100,656 A * | 8/2000 | El-Sadi et al. | 318/254 |
| 6,124,689 A * | 9/2000 | Kardash | 318/254 |
| 6,148,240 A * | 11/2000 | Wang et al. | 700/63 |
| 6,150,789 A * | 11/2000 | Pulford, Jr. | 318/685 |
| 6,151,200 A * | 11/2000 | Hsu et al. | 361/56 |
| 6,160,368 A * | 12/2000 | Plutowski | 318/375 |
| 6,166,503 A * | 12/2000 | Korbel et al. | 318/434 |
| 6,166,566 A | 12/2000 | Strong | |
| 6,198,241 B1 * | 3/2001 | Calamatas | 318/434 |
| 6,204,621 B1 | 3/2001 | Gotou | |
| 6,205,037 B1 | 3/2001 | Fitzgerald, Jr. | |
| 6,218,794 B1 | 4/2001 | Shimizu et al. | |
| 6,233,625 B1 | 5/2001 | Vander Kamp et al. | |
| 6,246,651 B1 | 6/2001 | Fukinuki et al. | |
| 6,252,752 B1 * | 6/2001 | Nagahama | 361/31 |
| 6,282,046 B1 | 8/2001 | Houston et al. | |
| 6,285,149 B1 * | 9/2001 | Brenden et al. | 318/439 |
| 6,285,521 B1 | 9/2001 | Hussein | |
| 6,286,108 B1 | 9/2001 | Kamo et al. | |
| 6,304,409 B1 | 10/2001 | Allsup | |
| 6,384,554 B1 * | 5/2002 | Karwath et al. | 318/254 |
| 6,407,523 B1 * | 6/2002 | Allan | 318/430 |
| 6,577,088 B2 | 6/2003 | Heydt et al. | |
| 6,667,843 B2 * | 12/2003 | Norman et al. | 360/67 |
| 6,710,567 B2 | 3/2004 | Heydt et al. | |
| 6,727,670 B1 * | 4/2004 | Grabowski et al. | 318/432 |
| 2003/0042858 A1 * | 3/2003 | Weinbrenner | 318/139 |
| 2003/0226987 A1 * | 12/2003 | Gallmeyer et al. | 251/129.04 |
| 2004/0189221 A1 * | 9/2004 | Kurosawa et al. | 318/254 |

* cited by examiner

POWER SUPPLY OUTPUT CONTROL APPARATUS AND METHOD

CROSS REFERENCE TO RELATED APPLICATIONS

This application claims the benefit of U.S. Provisional Application No. 60/253,216, filed Nov. 27, 2000.

FIELD OF THE INVENTION

The present invention relates generally to limiting current in a motor during a start-up or a run process. More particularly, the present invention relates to controlling the start-up current and run current of a spindle motor in a disc drive.

BACKGROUND OF THE INVENTION

In the never-ending struggle to produce cheaper, faster, and more reliable computer systems, power consumption has taken on a significant role. Specifically, power to operate the disc drive is supplied by the computer; therefore, the voltage and current demands of the disc drive must meet the specifications that are imposed by the computer power supply capabilities. As development of computer systems have progressed, the amount of power available to disc drives has decreased or remained the same while the speed (revolutions-per-minute) and capacity of the disc drive has increased. As disc drives achieve faster revolutions-per-minute (RPMs), the amount of power needed to achieve the faster RPMs could also increase. Thus, there is a need to control and limit the amount of power used by the disc drive.

One way to accomplish controlling and limiting the power consumed by the disc drive is to monitor and limit the peak motor current through the spindle motor of the disc drive. An example of this is described in U.S. Pat. No. 5,216,343 (Genheimer et al.).

While this method is effective in controlling the peak current through the spindle motor, it does not uniformly control the current drawn from the power supply. In fact, significant peaks in the current drawn from the power supply exist at multiple stages during the motor spin-up. These peaks can cause instability, dropouts, and power faults in some power supply systems.

Due to the highly competitive nature of the disc drive industry, it is necessary to produce disc drives which meet customer requirements at the lowest possible price. One method to accomplish this is to lower costs by reducing the number of components needed within the disc drive. This highlights another problem associated with controlling the peak current through the spindle motor: the control mechanisms require additional electronics and hardware components to be added to the disc drive.

The present invention provides a solution to these and other problems, and offers other advantages over the prior art.

SUMMARY OF THE INVENTION

The present invention relates to controlling the start-up current and run current of a spindle motor.

In accordance with one embodiment of the invention, a method for controlling the start-up power of a motor is provided in which the amount of current through a spindle motor is monitored. In another embodiment of the invention, a motor start-up sequence is disabled if the correct conditions materialize. Another embodiment includes using a preprogrammed start-up disc profile as a voltage reference from a digital-to-analog converter.

In yet another embodiment of the present invention, a method is provided for controlling the current drawn from a power supply. Another embodiment of the invention allows the motor drivers to be disabled.

In accordance with another embodiment of the invention, a method for controlling the run power of a motor is provided in which the amount of current through a spindle motor is monitored. In another embodiment of the invention, a motor run sequence is disabled if the correct conditions materialize. Another embodiment includes using a preprogrammed run disc profile as a voltage reference from a digital-to-analog converter.

In another embodiment of the present invention, the invention also can be implemented as a data storage device itself.

These and various other features as well as advantages which characterize the present invention will be apparent upon reading of the following detailed description and review of the associated drawings.

DETAILED DESCRIPTION

Figure 1:
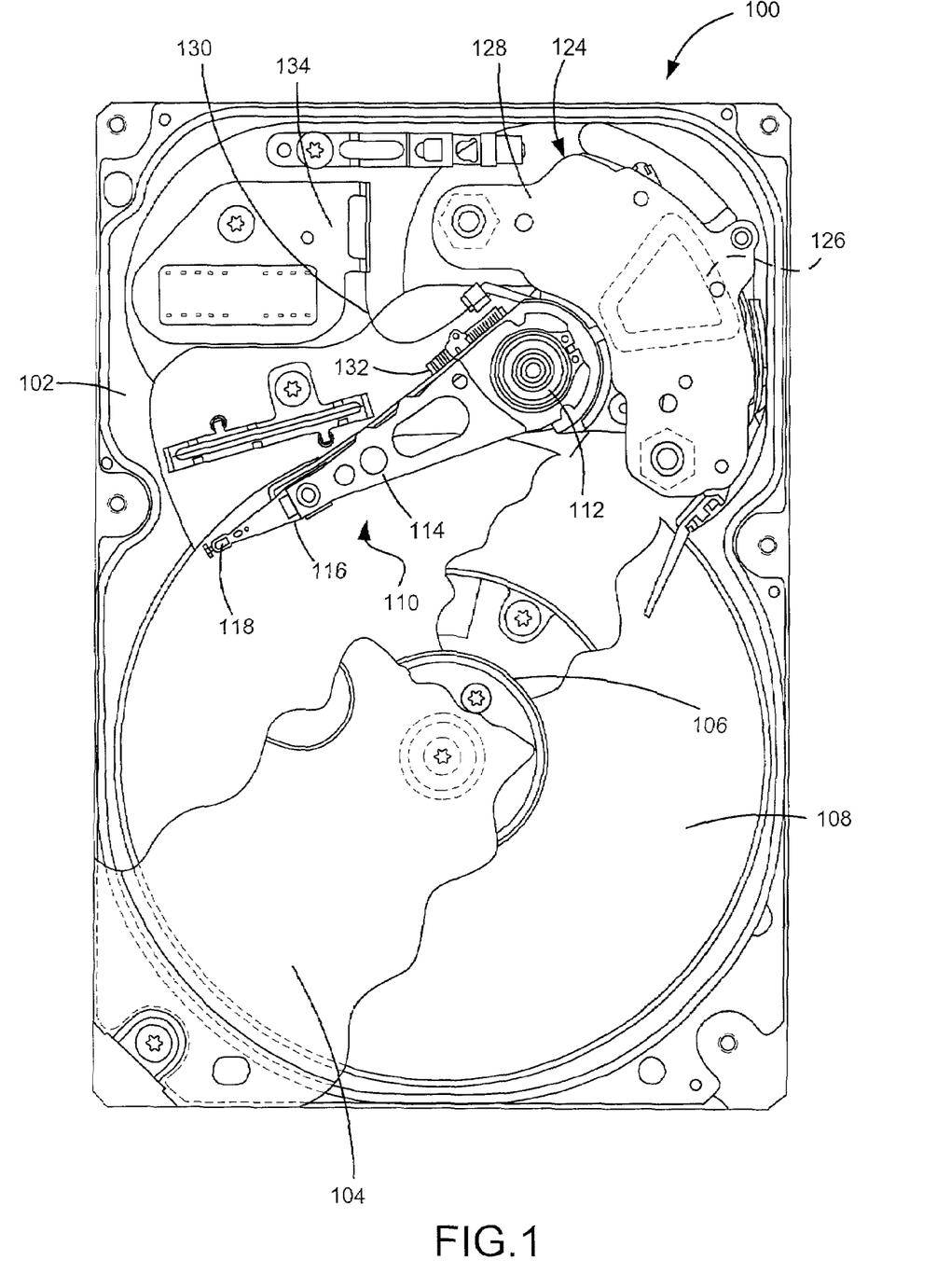
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 that rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 that includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones (not shown) near the inner diameter of the discs 108 when the drive motor is de-energized. The heads 118 are secured over the park zones (not shown) through the use of an actuator latch arrangement, which prevents inadvertent rotation of the actuator assembly 110 when the heads are parked. The heads 118 may alternatively be parked on ramps (not shown) at the outer diameter of the discs 108 when the drive motor is de-energized.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
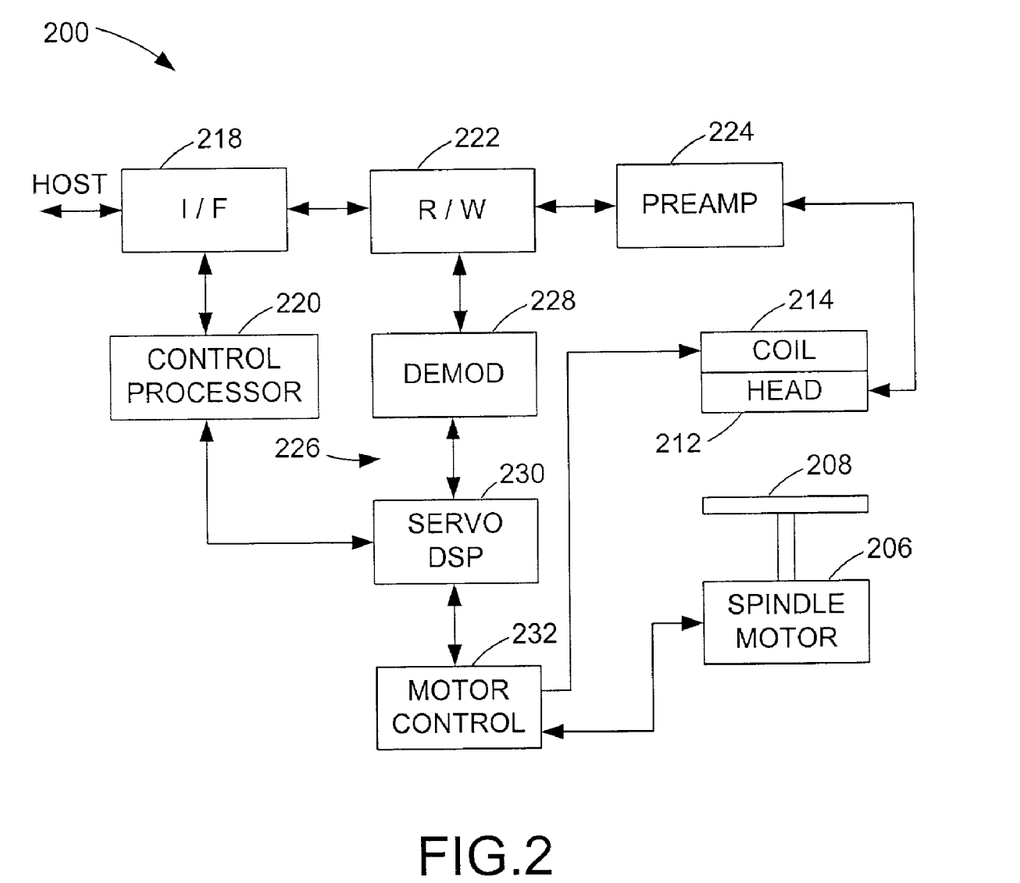
FIG. 2 provides a functional block diagram of the disc drive of FIG. 1.

FIG. 2 provides a functional block diagram of the disc drive 100. Data and host commands are provided from a host device to the disc drive 200 using interface circuitry 218 in conjunction with a top level control processor 220. Data is transferred between the discs 208 and the host device using the interface circuitry 218, a read/write channel 222, a preamplifier circuit 224, and a head 212.

Head positional control is provided by a closed-loop servo circuit 226 comprising demodulation circuitry 228, a servo processor 230 (preferably comprising a digital signal processor, or DSP) and motor control circuitry 232. The motor control circuitry 232 applies drive currents to the actuator coil 214 to rotate the actuator assembly 110. The motor control circuitry 232 further applies drive signals to the spindle motor 206 to rotate the discs 208.

Figure 3:
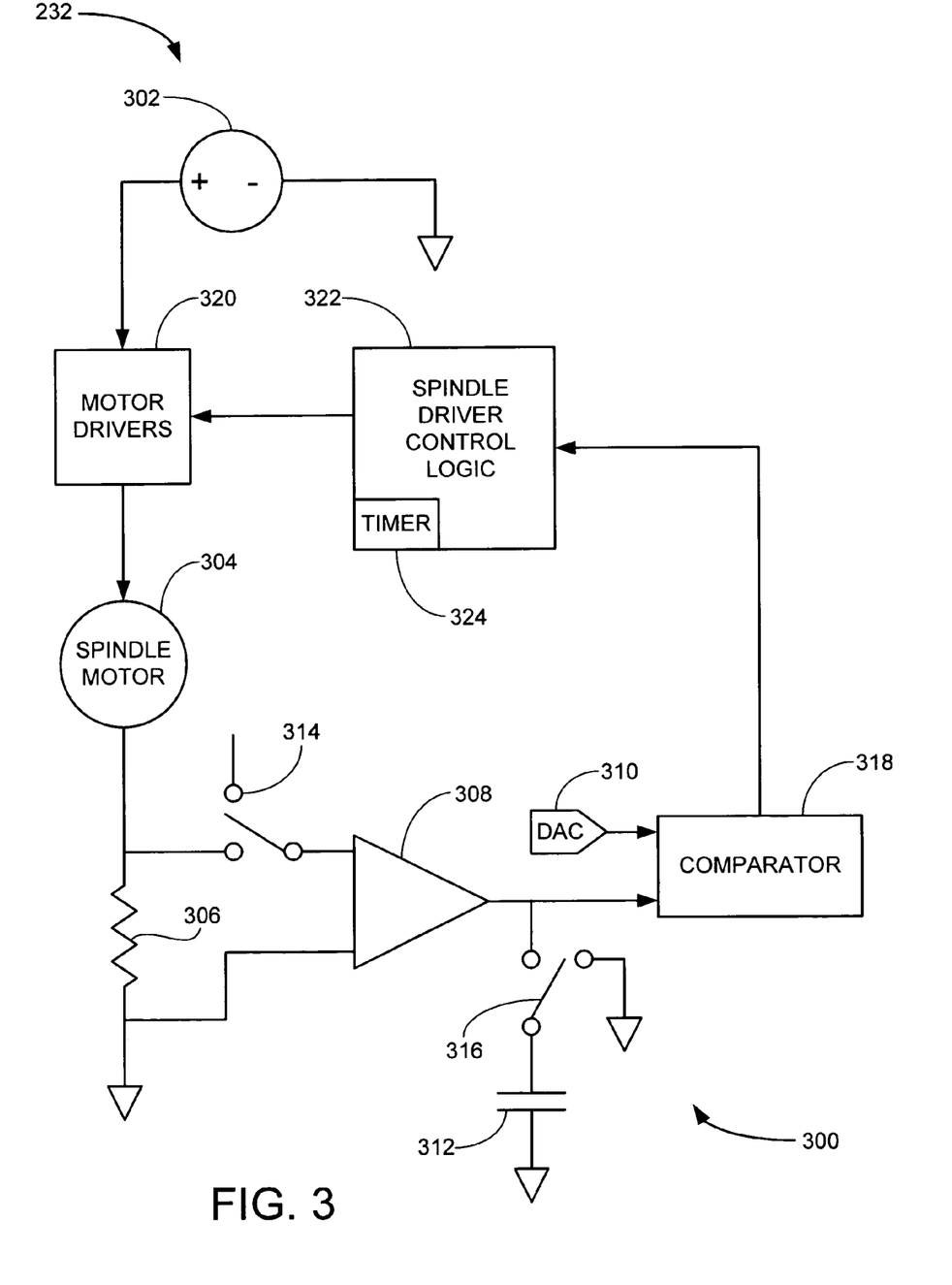
FIG. 3 is a diagram of a preferred embodiment current control apparatus which can be used in the system of FIG. 1.

FIG. 3 provides a functional system diagram of relevant portions of the motor control circuitry 232 of FIG. 2. FIG. 3 is also a system diagram of the preferred embodiment current control circuit 300. The current control circuit 300 includes a power supply 302 which is provided by a host computer system (not shown). The power supply 302 powers a spindle motor 304 by way of motor drivers 320. The motor drivers 320 are controlled by spindle driver control logic 322 with an associated programmable timer/counter circuit 324. The voltage across current sensing resistor 306 is measured when the calibrating switch 314 is not enabled. Calibrating switch 314 may be enabled during the power-up procedure of a drive.

In the preferred embodiment, the calibrating switch 314 provides a calibration reference signal for a 'once at power-up' calibration of the electronics from the digital-to-analog converter (DAC) 310 through comparator 318. The 'once at power-up' calibration is achieved by applying a precision reference voltage (not shown) through the initiating switch 314. This allows calibration of the DAC 310 by using a command from the DAC 310 to adjust the DAC 310 reference voltage input into the comparator 318. Then a comparison can be made between the DAC 310 voltage input and the precision reference voltage by analyzing the comparator 318 output trip threshold. This calibration procedure can be used to eliminate offsets in the current control circuitry. Specifically, this calibration method can be used to measure offsets in the comparator 318, the gain multiplier 308, and the DAC 310.

When calibrating switch 314 is not enabled, gain multiplier 308 multiplies the voltage from the current sensing resistor 306 by a predetermined gain. When switch 316 is closed, the output of the gain multiplier 308 is then applied to capacitor 312, integrating the output of the gain multiplier 308. The integrating capacitor 312 produces a voltage at its terminals proportional to the total current applied to the motor 304. When this voltage from the integrating capacitor 312 reaches a level equal to or greater than the voltage reference set by the DAC 310, one-shot comparator 318 will fire a finite, programmable duration pulse which will disable motor drivers 320 and reset switch 316. After being triggered, reset switch 316 discharges the capacitor 312 before the cycle repeats. After the finite programmable duration pulse time expires, the motor drivers are re-enabled and the process repeats.

Figure 4:
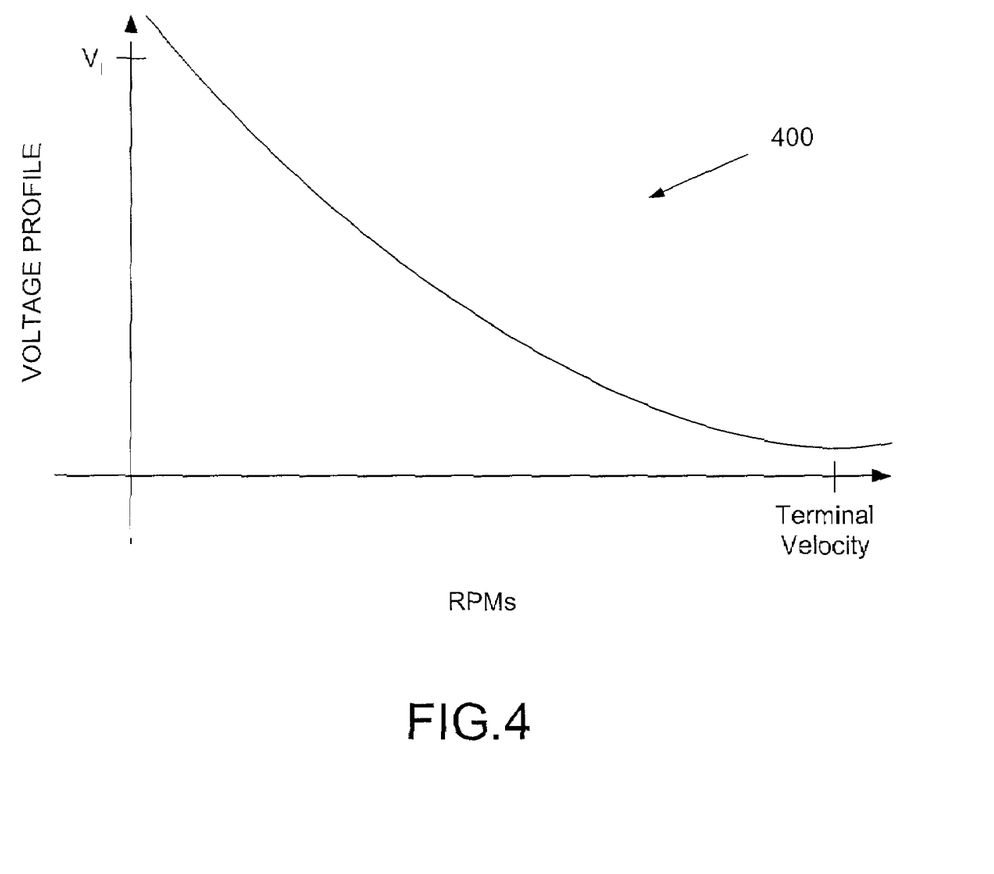
FIG. 4 is a graphical representation of a spindle motor start-up profile which can be used in the apparatus of FIG. 2.

The charge in the capacitor 312 is measured by at least one input of voltage comparator 318. DAC 310 supplies a reference voltage to another input of the voltage comparator 318. The reference voltage from the DAC 310 is determined by a preprogrammed velocity dependent reference profile 400 as illustrated in FIG. 4. The reference voltage from the DAC 310 does not need to be set to a specific reference profile, the reference voltage from the DAC 310 may be set to any value, such as a constant value or a time-dependent value.

A velocity dependent reference profile 400 may be stored in memory (not shown) accessible by the DSP 230. The motor control circuitry 232 includes circuitry (not shown) that measures the velocity of the discs 108. DSP 230 transmits a data value to the DAC 310 where the data value corresponds to the preprogrammed velocity dependent reference profile 400.

The voltage comparator 318 is preferably a one-shot comparator which starts the programmable timer/counter circuit 324 to disable the motor drivers 320 when the voltage at the terminals of the capacitor 312 exceeds the voltage provided by the DAC 310. The motor drivers 320 are then disabled for a programmed amount of time before the cycle repeats. The cycle is repeated by re-engaging the motor drivers 320.

Figure 5:
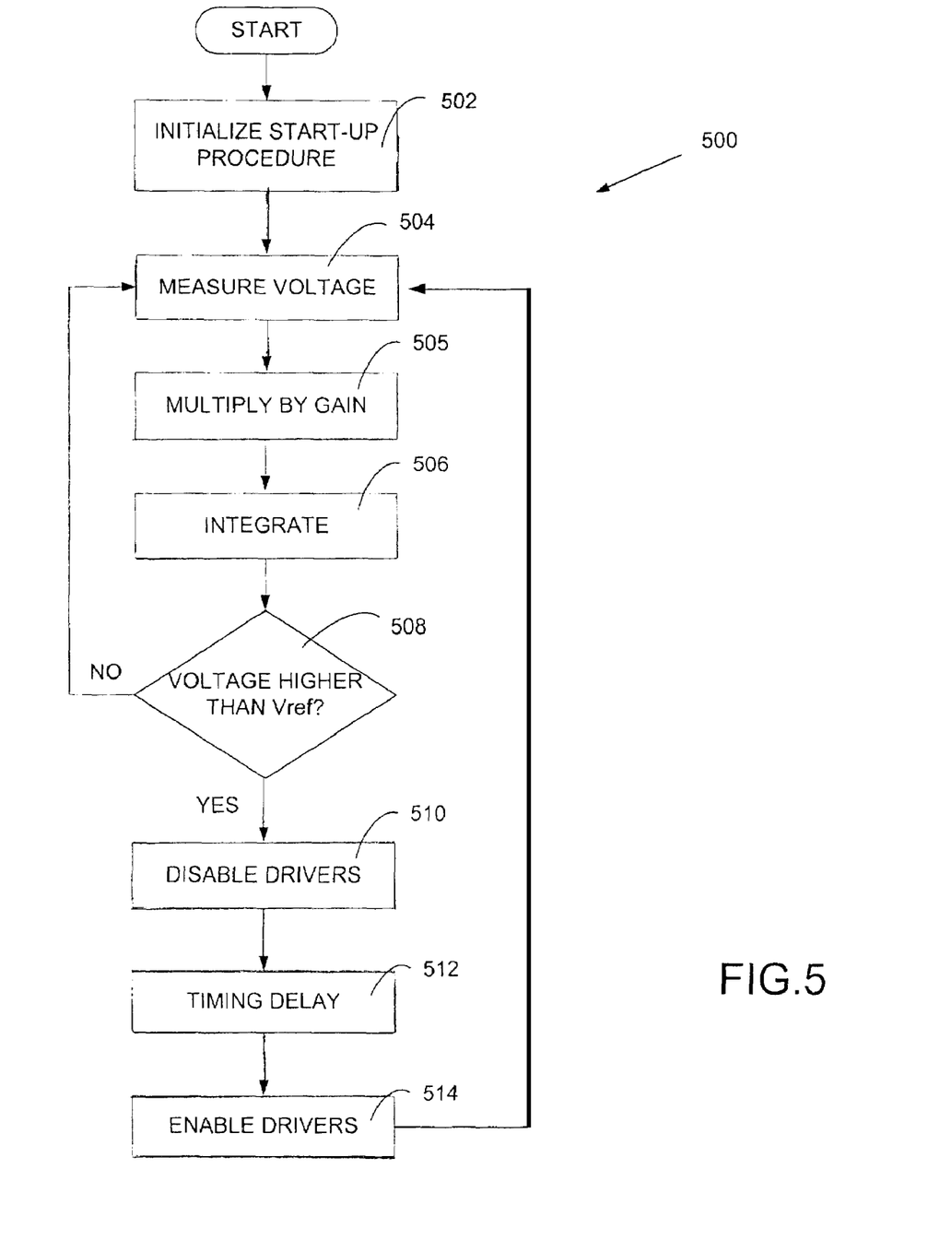
FIG. 5 is a flowchart detailing a preferred embodiment current control method.

FIG. 5 provides a flow chart for monitoring the start current or run current of the spindle motor 304 and the current drawn from the power supply 302, generally illustrative of the steps carried out in accordance with preferred embodiments. The current controlling routine 500 is preferably executed each time the drive is brought from a deactivated to an operationally ready state. The current controlling routine 500 may also be implemented while the drive is in a run process.

The routine starts at step 502 to initialize the start-up procedure for the spindle motor. This preferably includes providing power to the spindle motor from a rest state. The preferred embodiment also includes calibrating the circuitry and determining the initial setting for the reference profile 400.

After start-up procedure is initialized during step 502, the voltage of the current sensing resistor 306 is then measured in step 504. The voltage from step 504 is then multiplied by a gain multiplier in step 505. Next, the multiplied voltage from step 505 is integrated in step 506. The integration is preferably done using a capacitor 312 at the output of the gain multiplier 308 and at the input of the voltage comparator 318.

After the multiplied voltage is integrated, step 508 compares the integrated voltage to a reference voltage value. This is preferably done using a voltage comparator 218 and a DAC 310 with a preprogrammed reference voltage. If the integrated voltage value is less than the reference voltage value, then the routine will repeat back step 502. If the integrated voltage value is greater than or equal to the reference voltage value then the process proceeds to step 510.

In step 510, the process disables the motor drivers 320. This is preferably done by sending a disable signal to the spindle driver control logic 322. After step 510 is complete, the routine proceeds with timing delay 512. The routine counts the amount of time on step 512 until a preprogrammed time has passed. When the preprogrammed time has passed the process enables the motor drivers 320 in step 514. Re-enabling the motor drivers 320, step 514, may also include re-enabling voltage to the motor 304. After the drivers 320 are enabled, the process repeats back to the measure voltage step 504. In the preferred embodiment, the measure voltage step 504 also includes monitoring the motor velocity and adjusting the DAC 310 reference voltage according to a velocity dependent reference profile, such as 400.

One advantage of the current control system 300 over other designs is that the amount of voltage and current drawn from the power supply is limited. Controlling the power supply in this manner reduces high frequency current spikes seen on the power supply due to motor commutation switching during spindle motor start-up. Another of the advantages of the current control system 300 over other types of designs is the use of the DAC 310 provides a programmable means for adjusting the reference voltage without having to place additional components on a circuit board. Using a DAC 310 provides the ability to have variations as to what type of reference voltage is used. The reference voltage may be determined by values such as constants, time dependent values, velocity dependent values, or any other value.

Alternately characterized, a first contemplated embodiment of the present invention includes a method in which controlling the start-up power of a motor is monitored. The method comprises steps of initially applying power to a spindle motor to engage a start-up sequence (such as step 502). Thereafter, the amount of current applied to the spindle motor during the start-up sequence is monitored (such as step 504). Preferably, the method also includes obtaining a control voltage proportional to the motor voltage and disabling the start-up sequence if the control voltage exceeds a predetermined voltage threshold (such as steps 505 and 508). Preferably, the voltage threshold (such as step 508) is obtained from a digital-to-analog converter (such as 310). In preferred embodiments, the voltage threshold corresponds to a preprogrammed start-up disc profile (such as 400). The method further preferably comprises obtaining the control voltage by integrating (such as step 506) a voltage across a current sensing resistor (such as 306). Further, the method preferably comprises a calibration procedure initialized by a calibration switch (such as 314).

A second contemplated embodiment of the present invention includes a method for controlling the current drawn from a power supply in a computer system. The method comprises steps of initially applying power to a spindle motor to engage a start-up sequence (such as step 502). Thereafter, the amount of voltage applied to the spindle motor during the start-up sequence is monitored (such as step 504). Preferably, the method also includes obtaining a control voltage proportional to the motor voltage and disabling the start-up sequence if the control voltage exceeds a predetermined voltage threshold (such as steps 505 and 508). Preferably, the voltage threshold is obtained from a digital-to-analog converter (such as 310). In preferred embodiments, the voltage threshold corresponds to a preprogrammed startup disc profile (such as 400). The method further preferably comprises obtaining the control voltage by integrating (such as step 506) a voltage across a current sensing resistor (such as 306). Further, the method preferably comprises a calibration procedure initialized by a calibration switch (such as 314).

A third contemplated embodiment is a data storage device including at least one spindle motor, a power supply electrically coupled to the spindle motor (such as 302), and a spindle motor controller (such as 232). The spindle motor controller (such as 232) is operatively coupled to the spindle motor and the power supply so as to measure and limit an amount of power from the power supply that is utilized by the spindle motor during a spindle motor start-up sequence (such as 500) or a spindle motor run sequence. Optionally the data storage device includes a driver control function programmed into the motor controller so that a spindle motor driver (such as 320) may be disabled for a fixed period of time.

Preferably, the data storage device includes a data storage device controller (such as 220) which is operably coupled to the spindle motor controller (such as 232), the data storage device controller having the functionality to initiate or deactivate the spindle motor start-up sequence.

In preferred embodiments, the driver control function disables the spindle motor drivers when a signal proportional to a current through the spindle motor exceeds a predetermined threshold. Preferably, the predetermined threshold is a programmable voltage from a digital-to-analog converter (such as 310).

Another contemplated embodiment of the present invention includes a method in which controlling the run power of a motor is monitored. The method comprises steps limiting the amount of current applied to the spindle motor during the run sequence (such as step 504). Preferably, the method also includes obtaining a control voltage proportional to the motor voltage and disabling the run sequence if the control voltage exceeds a predetermined voltage threshold (such as steps 505 and 508). Preferably, the voltage threshold (such as step 508) is obtained from a digital-to-analog converter (such as 310). In preferred embodiments, the voltage threshold corresponds to a preprogrammed start-up disc profile (such as 400). The method further preferably comprises obtaining the control voltage by integrating (such as step 506) a voltage across a current sensing resistor (such as 306).

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the current control circuit and method while maintaining substantially the same functionality without departing from the scope and spirit of the present invention.

In addition, although the preferred embodiment described herein is directed to a current control apparatus and method for a disc drive system, it will be appreciated by those skilled in the art that the teachings of the present invention can be applied to other systems, like floppy drives, CD-ROMs, and DVD players, or any other system employing a motor without departing from the scope and spirit of the present invention.

What is claimed is:

1. A system comprising:
   a motor coupleable to a power supply;
   a sensor coupleable to the motor; and
   a control circuit including a comparator coupled between an input and an output, the input being coupleable to the sensor, wherein the control circuit provides an output signal on the output responsive to an amount of charge provided from the power supply that is at least equal to a predetermined threshold, the predetermined threshold selected from a profile of said thresholds that decrease in magnitude during application of power to said motor.

2. The system of claim 1 wherein the control circuit includes an integrator coupled between the input and the output.

3. The system of claim 1 wherein the comparator is a one-shot type.

4. The system of claim 1 further comprising motor drivers that are coupleable to the motor and the output, wherein the motor drivers are controlled responsive to the output signal.

5. The system of claim 4 wherein the motor drivers are disabled responsive to the amount of charge being at least equal to the predetermined threshold.

6. The system of claim 1, wherein the profile is applied during acceleration of the motor to an operational velocity.

7. A system comprising:
a motor coupleable to a power supply;
a sensor coupleable to the motor; and
a control circuit including an integrator coupled between an input and an output, the input being coupleable to the sensor, wherein the control circuit provides an output signal on the output responsive to an amount of charge provided from the power supply that is at least equal to a predetermined threshold, the predetermined threshold selected from a profile of said thresholds that decrease in magnitude during application of power to said motor.

8. The system of claim 7, further comprising motor drivers that are coupleable to the motor and the output, wherein the motor drivers are controlled responsive to the output signal.

9. The system of claim 8, wherein the motor drivers are disabled responsive to the amount of charge being at least equal to the predetermined threshold.

10. The system of claim 7, wherein the profile is applied during acceleration of the motor to an operational velocity.

* * * * *